UNITED STATES PATENT OFFICE.

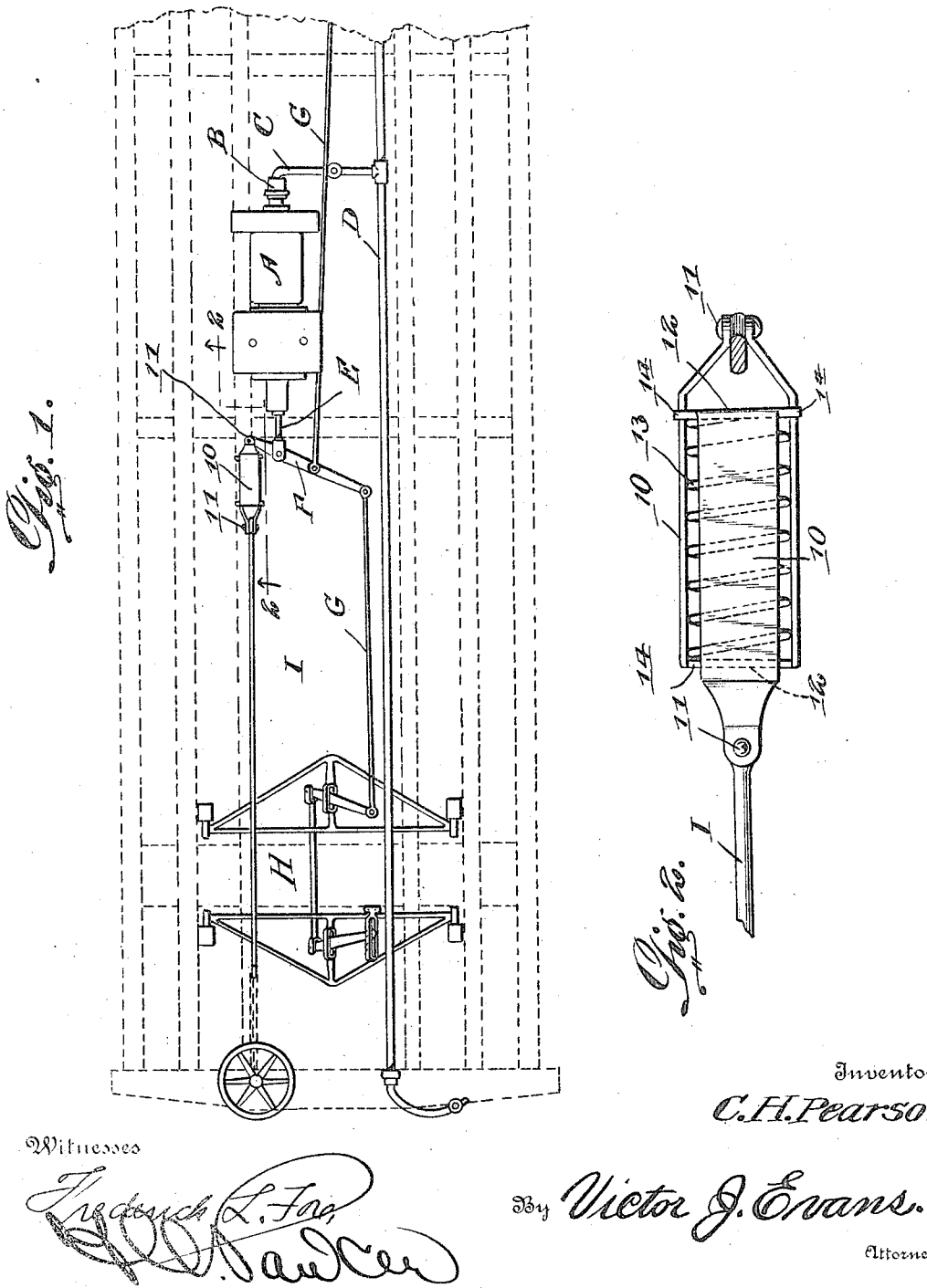

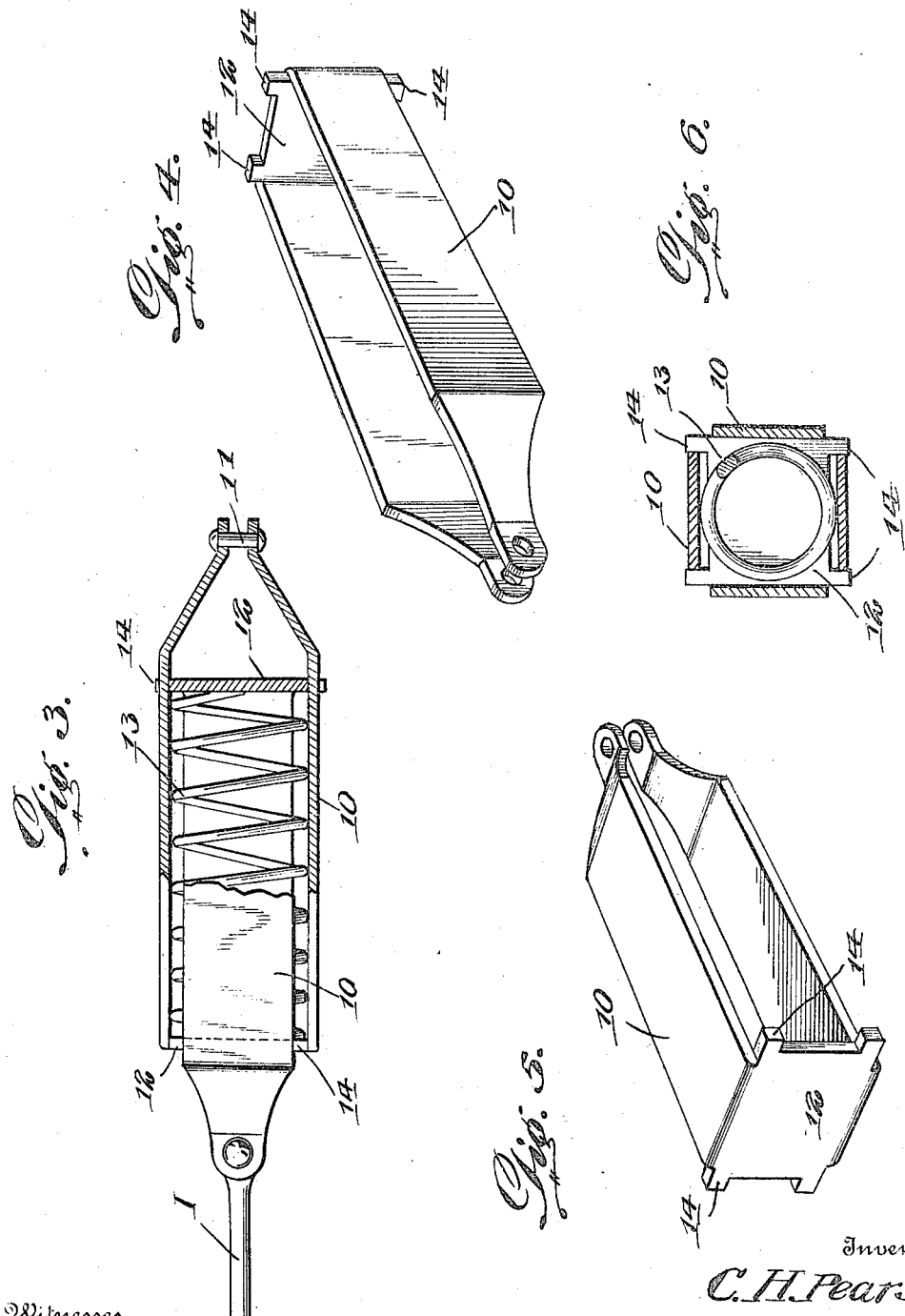

CHARLES H. PEARSON, OF TOPEKA, KANSAS.

CAR HAND-BRAKE.

1,236,346.   Specification of Letters Patent.   Patented Aug. 7, 1917.

Application filed July 21, 1916. Serial No. 110,578.

*To all whom it may concern:*

Be it known that I, CHARLES H. PEARSON, a citizen of the United States, residing at Topeka, in the county of Shawnee and State of Kansas, have invented new and useful Improvements In Car Hand-Brakes, of which the following is a specification.

The invention relates to a car hand brake, and more particularly to the class of hand brake rod attachments for use with the car air brake systems and the hand brake for said car.

The primary object of the invention is the provision of an attachment of this character wherein a compression spring is connected between the cylinder lever of the air brake system and the hand brake rod so that when a car is at a standstill and the air brakes thereto are applied the strain upon the hand brake rod and the adjunct parts is relieved and the attachment will also assist in the operation of the hand brake, relieving excessive straining or jarring action.

A further object of the invention is the provision of an attachment of this character wherein, on the releasing of the brake operated by the air brake system subsequent to the application of the hand brake, the latter can be readily released without undue exertion or strain upon the operator and the air brakes can also be set if desired after the hand brakes are applied.

A further object of the invention is the provision of an attachment of this character wherein the necessity of bleeding the air brake system to zero upon the car is eliminated and will avoid the necessity for the use of a rigid hand brake that locks with the wheels after the car is at rest as well as serving to assist in the setting and releasing of the hand brakes.

A still further object of the invention is the provision of an attachment of this character which can be readily connected with the ordinary hand brake mechanism used in conjunction with the air brake system without requiring material alteration in the mechanism either of the air brake system or the hand brake.

A still further object of the invention is the provision of an attachment of this character which is extremely simple in construction, thoroughly reliable and efficient in operation, strong, durable and inexpensive in manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claims.

In the accompanying drawings:

Figure 1 is a diagrammatic top plan view of a car showing in detail the air brake system thereon and the attachment constructed in accordance with the invention associated with the hand brake;

Fig. 2 is a sectional view on the line 2—2 of Fig. 1;

Fig. 3 is an enlarged fragmentary vertical longitudinal sectional view through the attachment;

Fig. 4 is a perspective view of one of the yokes of the attachment;

Fig. 5 is a perspective view of the other yoke of the attachment;

Fig. 6 is a perspective view of the attachment.

Similar reference characters indicate corresponding parts throughout the several views of the drawings.

Referring to the drawings in detail, A designates generally the brake cylinder; B, the triple valve; C, the elbow having connection with and leading from the train air brake pipe D which is a part of the air brake system of the usual well known construction, while E is the piston rod to which is connected the cylinder lever F, the same having connected thereto, as usual, the rods G for actuating the wheel brakes H, and to this cylinder lever F is usually connected the hand brake rod I which is manually actuated as usual, and interposed between the cylinder lever and the rod is the attachment hereinafter fully described.

The attachment comprises a pair of interfitting slidable yokes 10, each formed from a single piece of band-like material bent into the form shown, and the ends of each yoke are pivotally connected together through the medium of the bolt 11 which, in one yoke, is engaged in the cylinder lever, while in the other yoke it is engaged in the inner end of the hand brake rod I, while between the closed heads 12 of these interfitting yokes 10 is arranged a coiled compression spring 13, each end thereof playing against the head 12 of the respective yokes which serve as a housing for the spring, and said yokes act upon the springs in opposition to each other under those conditions of operation which will readily be apparent.

The heads 12 are formed with counter-guide ears 14 for preventing lateral displacement of the yokes when interfitted with each other, yet the yokes are free for relative sliding movement, as will be obvious.

From the foregoing description, taken in connection with the accompanying drawings, the construction and operation of the herein described car brake will be readily apparent and, therefore, a more extended explanation has been omitted.

Having thus described my invention, I claim:

1. In a device of the class described, a lever, an air brake cylinder having connection with one end thereof, a hand brake rod, and an attachment connecting said rod with said lever, and comprising a plurality of combined relatively slidable yokes and guide members, said yokes interfitting and having substantially parallel sides, and end portions at right angles with the sides, the end portion of each yoke being of greater width than the sides and being cut away to form laterally extending members between which the parallel sides of the other yoke may reciprocate, and a spring interposed between the end portions of the two yokes, and bearing directly against said end portions.

2. In an attachment for relieving strains on rods of car brakes, a plurality of combined relatively slidable yokes and guide members, said yokes interfitting and having substantially parallel sides, and end portions at right angles with the sides, the end portion of each yoke being of greater width than the sides and being cut away to form laterally extending members between which the parallel sides of the other yoke may reciprocate, and a spring interposed between the end portions of the two yokes, and bearing directly against said end portions.

In testimony whereof I affix my signature.

CHARLES H. PEARSON.

Copies of this patent may be obtained for five cents each, by addressing the "Commissioner of Patents, Washington, D. C."